United States Patent
Senshu et al.

(10) Patent No.: US 9,764,980 B2
(45) Date of Patent: Sep. 19, 2017

(54) GLASS COMPOSITION, GLASS COMPOSITION FOR CHEMICAL STRENGTHENING, STRENGTHENED GLASS ARTICLE, AND COVER GLASS FOR DISPLAY

(71) Applicant: Nippon Sheet Glass Company, Limited, Tokyo (JP)

(72) Inventors: Yutaka Senshu, Hyogo (JP); Junji Kurachi, Hyogo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 100 days.

(21) Appl. No.: 14/777,683

(22) PCT Filed: Mar. 13, 2014

(86) PCT No.: PCT/JP2014/001442
§ 371 (c)(1),
(2) Date: Sep. 16, 2015

(87) PCT Pub. No.: WO2014/148020
PCT Pub. Date: Sep. 25, 2014

(65) Prior Publication Data
US 2016/0214885 A1    Jul. 28, 2016

(30) Foreign Application Priority Data
Mar. 22, 2013   (JP) .................................. 2013-060489

(51) Int. Cl.
*C03C 3/087* (2006.01)
*C03C 21/00* (2006.01)

(52) U.S. Cl.
CPC ............ *C03C 3/087* (2013.01); *C03C 21/002* (2013.01)

(58) Field of Classification Search
CPC ......... C03C 3/087; C03C 3/091; C03C 3/095; C03C 21/00; C03C 21/002
See application file for complete search history.

(56) References Cited

U.S. PATENT DOCUMENTS

| | | | |
|---|---|---|---|
| 8,715,829 B2 | 5/2014 | Akiba et al. | |
| 2009/0298669 A1* | 12/2009 | Akiba | C03C 3/085 501/70 |
| 2012/0171497 A1 | 7/2012 | Koyama et al. | |
| 2012/0196110 A1* | 8/2012 | Murata | C03B 25/08 428/220 |
| 2013/0017380 A1* | 1/2013 | Murata | C03B 25/08 428/215 |
| 2013/0093312 A1* | 4/2013 | Ono | C03C 3/085 313/489 |
| 2015/0038316 A1* | 2/2015 | Kobayashi | C03C 3/091 501/66 |

FOREIGN PATENT DOCUMENTS

| | | |
|---|---|---|
| CN | 102531384 | 7/2012 |
| JP | 10-001329 | 1/1998 |
| JP | 2010-116276 | 5/2010 |
| JP | 2010-168252 | 8/2010 |
| JP | 2010-527892 | 8/2010 |
| JP | 2010-275126 | 12/2010 |
| JP | 2010-275144 | 12/2010 |
| WO | 2008/143999 | 11/2008 |

* cited by examiner

*Primary Examiner* — Elizabeth A Bolden
(74) *Attorney, Agent, or Firm* — Hamre, Schumann, Mueller & Larson, P.C.

(57) ABSTRACT

A glass composition of the present invention includes, in mol %, 66 to 72% $SiO_2$, 1 to 4% $Al_2O_3$, 8 to 15% MgO, 1 to 8% CaO, 12 to 16% $Na_2O$, and 0 to 1% $K_2O$. A total content of MgO and CaO is in a range of 12 to 17%, and a molar ratio of CaO to the total content of MgO and CaO is in a range of 0.1 to 0.4. The glass composition of the present invention is suitable for production by the float process, and is suitable for chemical strengthening.

13 Claims, No Drawings

GLASS COMPOSITION, GLASS COMPOSITION FOR CHEMICAL STRENGTHENING, STRENGTHENED GLASS ARTICLE, AND COVER GLASS FOR DISPLAY

TECHNICAL FIELD

The present invention relates to a glass composition suitable for chemical strengthening, more specifically to a glass composition having properties suitable for production by the float process and for use in a cover glass of a display. The present invention also relates to a glass composition for chemical strengthening, a strengthened glass article formed by chemically strengthening the glass composition, and a cover glass for a display in which the strengthened glass article is used.

BACKGROUND ART

In recent years, there have been widespread electronic devices equipped with liquid crystal displays, organic EL displays or the like, and electronic devices equipped with touch panel displays. Glass materials have high surface hardness, and therefore are widely used as materials of cover glasses of the displays of these electronic devices. Such cover glasses are generally subjected to strengthening treatment because glass is a typical brittle material and because decreasing thickness and weight of the electronic devices have created a demand for thinner cover glasses.

Thermal tempering and chemical strengthening are typical examples of strengthening treatment for glass sheets. For thin glass sheets such as a cover glass of a display, the chemical strengthening is generally used. The chemical strengthening is a technique of replacing alkali metal ions contained in the glass surface by monovalent cations having a larger ionic radius so as to form a compressive stress layer in the glass surface. The chemical strengthening is often performed by replacing lithium ions ($Li^+$) by sodium ions ($Na^+$) or by replacing sodium ions by potassium ions ($K^+$).

By performing chemical strengthening treatment on a glass sheet widely commercially available as float sheet glass, a compressive stress layer can be formed in the glass surface. In this case, however, the value of the produced surface compressive stress or the depth of the formed compressive stress layer may be insufficient; for example, the value of the surface compressive stress may be less than 600 MPa or the stress layer depth may be less than 20 μm (see Comparative Example 5 of Patent Literature 1).

In view of such circumstances, there have been reported many inventions relating to a glass composition that can provide a large value of the surface compressive stress or a glass composition that can provide a large depth of the compressive stress layer.

A glass composition suitable for chemical strengthening that is disclosed in Patent Literature 2 contains 64 to 68 mol % $SiO_2$, 8 to 12 mol % $Al_2O_3$, 12 to 16 mol % $Na_2O$, 2 to 5 mol % $K_2O$, and 4 to 6 mol % MgO, and in this composition the total content of alkaline earth metal oxides (MgO+CaO+SrO) has been adjusted to 5 to 8 mol % (see claim 1). In order to be suitable for production by the down-draw process, the glass composition described in Patent Literature 2 has a melting temperature of less than 1650° C. and a liquid viscosity of at least 13 kPa·s. In the examples given in Patent Literature 2, the temperature at which the glass has a viscosity of 200 P (200 dPa·s) is 1536° C. or more, and the temperature at which the glass has a viscosity of 35 kP (35000 dPa·s) is 1058° C. or more.

A strengthened glass substrate suitable for use in a touch panel display that is disclosed in Patent Literature 3 contains, in mass %, 45 to 75% $SiO_2$, 1 to 30% $Al_2O_3$, 0 to 20% $Na_2O$, and 0 to 20% $K_2O$ (see claim 3). However, glass substrates substantially disclosed as examples contain not less than 13 mass % $Al_2O_3$; that is, a glass substrate containing less than 13 mass % $Al_2O_3$ is not substantially disclosed. Additionally, in the examples of Patent Literature 3, the temperature ($T_4$) at which the glass has a viscosity of $10^4$ dPa·s is 1122° C. or more.

A working temperature and a melting temperature are known as measures of the high-temperature viscosity of glass. In the float process, the working temperature is a temperature at which the glass viscosity is $10^4$ dPa·s, and will hereinafter be referred to as $T_4$. The melting temperature is a temperature at which the glass viscosity is $10^2$ dPa·s, and will hereinafter be referred to as $T_2$.

A chemically-strengthened glass sheet for a display device that is disclosed in Patent Literature 4 is one formed by chemically strengthening a glass sheet that contains 50 to 74 mol % $SiO_2$, 1 to 10 mol % $Al_2O_3$, 6 to 14 mol % $Na_2O$, and 3 to 15 mol % $K_2O$ and in which the total content of alkali metal oxides ($Na_2O+K_2O$) has been adjusted to 12 to 25 mol % and the total content of alkaline earth metal oxides (MgO+CaO) has been adjusted to 7 to 15 mol % (see claim 1). The glass sheet described in Patent Literature 4 is one produced by the float process (see claim 10). In all of the examples, however, $T_4$ is 1083° C. or more. Also, the value of the surface compressive stress is about 600 MPa or less in many of the examples. In examples in which a large value of the surface compressive stress is achieved, $ZrO_2$ is contained.

CITATION LIST

Patent Literature

Patent Literature 1: JP 10-001329 A
Patent Literature 2: JP 2010-527892 T
Patent Literature 3: JP 2010-116276 A
Patent Literature 4: JP 2010-275126 A

SUMMARY OF INVENTION

Technical Problem

Patent Literature 2 and 3 describe glass compositions having relatively high values of $T_4$ and $T_2$, and disclose or suggest that $T_4$ is about 1100° C. or more. Glass compositions having such high values of $T_4$ and $T_2$ are adapted for production by the down-draw process, but are disadvantageous for production by the float process. Patent Literature 4 discloses that the glass sheet can be produced by the float process; however, in view of the fact that the glass sheet has a high value of $T_4$ which is about 1083° C. or more and that $ZrO_2$ is essential for increasing the value of the surface compressive stress, the glass sheet is disadvantageous for production by the float process.

In view of the above circumstances, it is an object of the present invention to provide a glass composition for chemical strengthening. Particularly, it is an object of the present invention to provide a glass composition for chemical strengthening that has properties suitable for production by the float process and to do so using materials which are the same as the materials of float sheet glass very widely used in buildings or transportation machines.

Solution to Problem

In order to achieve the above object, the present invention provides a glass composition including, in mol %: 66 to 72% $SiO_2$; 1 to 4% $Al_2O_3$; 8 to 15% MgO; 1 to 8% CaO; 12 to 16% $Na_2O$; and 0 to 1% $K_2O$, wherein a total content of MgO and CaO is in a range of 12 to 17%, and a molar ratio of CaO to the total content of MgO and CaO is in a range of 0.1 to 0.4.

In another aspect, the present invention provides a strengthened glass article including a compressive stress layer formed as a surface of the strengthened glass article by bringing a glass article including the above-specified glass composition into contact with a molten salt containing monovalent cations having an ionic radius larger than that of sodium ions so as to allow ion exchange to take place between sodium ions contained in the glass composition and the monovalent cations.

Advantageous Effects of Invention

The glass composition of the present invention has a relatively low value of $T_4$, and is suitable for production by the float process. Furthermore, with the use of the glass composition of the present invention, it is possible to obtain a strengthened glass article having an appropriately deep compressive stress layer with an appropriately high surface compressive stress.

DESCRIPTION OF EMBODIMENTS

Hereinafter, the signs "%" used alone to indicate the percentages of the components of glass compositions all refer to "mol %", unless otherwise specified. In this description, "consisting essentially" of mentioned components means that the total content of the components is 99.5 mass % or more, preferably 99.9 mass % or more, and more preferably 99.95 mass % or more. Being "substantially free" of a component means that the content of the component is 0.1 mass % or less, and preferably 0.05 mass % or less.

The glasses disclosed in Patent Literature 2 to 4 have high high-temperature viscosities; therefore, they are disadvantageous in terms of producing a cover glass of a display by the float process and are disadvantageous also in terms of forming the glass into a thin sheet for use as a cover glass of a display.

Based on the composition ratio of float sheet glass (which may hereinafter be referred to as "narrowly-defined SL" or simply as "SL") that is suitable and widely used for production of glass sheets by the float process, the present inventors have made a study aimed at providing a glass composition with properties such as $T_2$ and $T_4$ made as close as possible to those of the narrowly-defined SL and with chemical strengthening properties better than those of the narrowly-defined SL by employing a range of composition ratios which are regarded by persons skilled in the art as those of soda-lime silicate glass (which may hereinafter be referred to as "broadly-defined SL") suitable for the float process. The range of composition ratios is specifically indicated in mass % below.

$SiO_2$ 65 to 80%
$Al_2O_3$ 0 to 5%
MgO 0 to 20%
CaO 0 to 20%
$Na_2O$ 10 to 20%
$K_2O$ 0 to 5%

As a result of the study, the inventors have, within the range of composition ratios of the broadly-defined SL, successfully found a glass composition that can provide both a distinctively large value of the surface compressive stress (≥700 MPa) and a great depth of the stress layer (≥20 µm), and thus completed the present invention. Furthermore, the glass composition of the present invention has the advantage of being able to be provided by using materials which are the same as the materials of float sheet glass very widely used in buildings or transportation machines.

Hereinafter, the components of the glass composition of the present invention will be described.

($SiO_2$)

$SiO_2$ is the main component of a glass composition. An excessively low content of $SiO_2$ reduces the chemical durability such as water resistance and heat resistance of the glass. On the other hand, an excessively high content of $SiO_2$ increases the viscosity of the glass composition at high temperatures and thus makes it difficult to melt and form the glass composition. Therefore, the appropriate content of $SiO_2$ is in the range of 66 to 72 mol %, and the content of $SiO_2$ is preferably 67 to 70 mol %.

($Al_2O_3$)

$Al_2O_3$ improves the chemical durability such as water resistance of a glass composition. $Al_2O_3$ is also a component for facilitating migration of alkali metal ions in the glass so as to increase the surface compressive strength achieved after chemical strengthening and also to increase the stress layer depth. However, an excessively high content of $Al_2O_3$ increases the viscosity of the glass melt and thereby $T_2$ and $T_4$, and affects the fining of the glass melt, which makes it difficult to produce a high quality glass sheet.

Therefore, the appropriate content of $Al_2O_3$ is in the range of 1 to 4 mol %. The content of $Al_2O_3$ is preferably 3 mol % or less and 2 mol % or more.

(MgO)

MgO is an essential component for increasing the meltability of glass. In terms of obtaining a sufficient level of this effect, the content of MgO in the glass composition of the present invention is 8 mol % or more. A low MgO content of below 8 mol % is likely to reduce the surface compressive stress achieved after chemical strengthening and reduce the stress layer depth. Increasing the MgO content beyond an appropriate limit reduces the strengthening effect obtained by chemical strengthening, and particularly leads to drastic reduction in the depth of the surface compressive stress layer. Although MgO has the lowest level of this adverse influence among alkaline earth metal oxides, the content of MgO is 15 mol % or less in the glass composition of the present invention. Also, a high MgO content increases $T_2$ and $T_4$ and affects the fining of the glass melt, which makes it difficult to produce a high quality glass sheet.

In the glass composition of the present invention, therefore, the content of MgO is in the range of 8 to 15 mol %, and preferably 12 mol % or less.

(CaO)

CaO has the effect of reducing the viscosity at high temperatures; however, an excessively high CaO content beyond an appropriate limit makes the glass composition more susceptible to devitrification, and also leads to inhibition of migration of sodium ions in the glass composition. If the glass composition is free of CaO, the surface compressive stress achieved after chemical strengthening is likely to be low. If the glass composition contains more than 8 mol % CaO, the surface compressive stress achieved after chemical strengthening is markedly lowered, and the compressive stress layer depth is considerably reduced, in addition to which the glass composition is made more susceptible to devitrification.

Therefore, the appropriate content of CaO is in the range of 1 to 8 mol %. The content of CaO is preferably 7 mol % or less and 3 mol % or more.

(SrO, BaO)

SrO and BaO significantly reduce the viscosity of a glass composition. If their contents are low, they are more effective than CaO in reducing the liquidus temperature $T_L$. However, even when added in very slight amounts, SrO and BaO markedly inhibit migration of sodium ions in the glass composition, thereby significantly decreasing the surface compressive stress and causing a considerable reduction in the depth of the compressive stress layer.

Therefore, it is preferable for the glass composition of the present invention to be substantially free of SrO and BaO.

(RO)

In the present invention, "RO" refers to the total of MgO and CaO. An excessively low content of RO leads to insufficiency of components for decreasing the viscosity of the glass composition, thereby making it difficult to melt the glass composition. An excessively high content of RO significantly decreases the surface compressive stress and causes a considerable reduction in the depth of the compressive stress layer, as well as being likely to drastically increase the liquidus temperature $T_L$.

Therefore, the appropriate content of RO is in the range of 12 to 17 mol %. The content of RO is preferably 14 mol % or more and 16 mol % or less.

If the molar ratio CaO/RO of the content of CaO to the content of RO is in the range of 0.1 to 0.4, the liquidus temperature is particularly likely to be low. Therefore, the appropriate value of this molar ratio is 0.1 to 0.4. Decreasing the molar ratio can provide an increase in the surface compressive stress and the depth of the compressive stress layer, but at the same time may increase $T_2$ and $T_4$ up to values far from those of the narrowly-defined SL, thereby making the production of a glass article difficult. Therefore, the molar ratio is preferably 0.2 or more and 0.3 or less.

(Na$_2$O)

Na$_2$O is a component for increasing the surface compressive stress and the depth of the surface compressive stress layer through replacement of sodium ions by potassium ions. However, increasing the Na$_2$O content beyond an appropriate limit leads to a situation where the magnitude of a surface compressive stress produced by ion exchange in chemical strengthening treatment is surpassed by the magnitude of stress relaxation during the chemical strengthening treatment, with the result that the surface compressive stress is likely to be reduced.

Na$_2$O is a component for increasing the meltability and reducing $T_4$ and $T_2$. However, an excessively high content of Na$_2$O markedly reduces the water resistance of the glass. When the content of Na$_2$O is 12 mol % or more in a glass composition, a sufficient effect on reducing $T_4$ and $T_2$ can be obtained. However, if the content is more than 16 mol %, there occurs a marked reduction in surface compressive stress due to stress relaxation.

Therefore, the appropriate content of Na$_2$O in the glass composition of the present invention is in the range of 12 to 16 mol %. The content of Na$_2$O is preferably 13 mol % or more and 15 mol % or less.

(K$_2$O)

Similarly to Na$_2$O, K$_2$O is a component that increases the meltability of glass. A lowered content of K$_2$O increases the rate of ion exchange in chemical strengthening and thereby the depth of the surface compressive stress layer, but at the same time reduces the liquidus temperature $T_L$ of the glass composition. Therefore, K$_2$O is preferably contained in a small amount.

K$_2$O has a lower effect on reducing $T_4$ and $T_2$ than Na$_2$O, and the presence of a high content of K$_2$O is obstructive to the fining of the glass melt. The higher the content of K$_2$O is, the more the surface compressive stress achieved after chemical strengthening is reduced. Therefore, the appropriate content of K$_2$O is in the range of 0 to 1 mol %.

(Li$_2$O)

Li$_2$O markedly reduces the depth of a compressive stress layer even if its content is low. Additionally, when a glass article containing Li$_2$O is subjected to chemical strengthening treatment in a molten salt of potassium nitrate alone, the rate of degradation of the molten salt is markedly higher than when a glass article free of Li$_2$O is subjected to the treatment. Specifically, in the case where the chemical strengthening treatment is repeatedly performed using the same molten salt, the surface compressive stress achieved in the glass surface is reduced with fewer repetitions of the treatment. Therefore, although the glass composition of the present invention may contain 1 mol % or less Li$_2$O, it is preferable for the glass composition to be substantially free of Li$_2$O.

(B$_2$O$_3$)

B2O$_3$ is a component that reduces the viscosity of a glass composition and improves the meltability of the glass composition. However, an excessively high content of B$_2$O$_3$ makes the glass composition more susceptible to phase separation and reduces the water resistance of the glass composition. Additionally, a compound formed from B$_2$O$_3$ and an alkali metal oxide may be vaporized and damage the refractory material of the glass melting chamber. Furthermore, the presence of B$_2$O$_3$ causes a reduction in the depth of the compressive stress layer formed by chemical strengthening. Therefore, the appropriate content of B$_2$O$_3$ is 0.5 mol % or less. In the present invention, the glass composition is more preferably one which is substantially free of B$_2$O$_3$.

(Fe$_2$O$_3$)

Generally, Fe is present in the form of $Fe^{2+}$ or $Fe^{3+}$ in glass, and acts as a coloring material. $Fe^{3+}$ is a component that enhances the ultraviolet absorbing properties of the glass, and $Fe^{2+}$ is a component that enhances the heat absorbing properties of the glass. When the glass composition is used in a cover glass of a display, it is preferable to minimize the content of Fe since conspicuous coloring needs to be avoided. However, it is often the case that Fe derived from an industrial raw material is inevitably mixed in the glass composition. In view of this fact, the content of total iron oxide as calculated in terms of Fe$_2$O$_3$ is advantageously 0.15 mass % or less, more preferably 0.1 mass % or less, and even more preferably 0.02 mass % or less per total 100 mass % of the glass composition.

(TiO$_2$)

TiO$_2$ is a component that reduces the viscosity of a glass composition and at the same time increases the surface compressive stress produced by chemical strengthening; however, TiO$_2$ may color the glass composition yellow. Therefore, the appropriate content of TiO$_2$ is in the range of 0 to 0.2 mass %. In some cases, TiO$_2$ derived from a commonly-used industrial raw material is inevitably mixed in a glass composition and contained in an amount of about 0.05 mass %. The glass composition of the present invention may have a TiO$_2$ content of about 0.05 mass % because such a low content of TiO$_2$ does not cause coloring of the glass.

($ZrO_2 $)

It is known that, when a glass sheet is produced by the float process, $ZrO_2$ derived from refractory bricks constituting the glass melting furnace may be mixed in the glass composition and contained in an amount of about 0.01 mass %. $ZrO_2$ is a component that improves the water resistance of glass and increases the surface compressive stress produced by chemical strengthening. However, a high content of $ZrO_2$ may induce an increase in the working temperature $T_4$ or a drastic increase in the liquidus temperature $T_L$. Additionally, if the content of $ZrO_2$ is high when a glass sheet is produced by the float process, a precipitated crystal containing Zr is likely to remain as a foreign matter in the produced glass. Therefore, the appropriate content of $ZrO_2$ is 0 to 0.1 mass %.

($SO_3$)

In the float process, a sulfate such as sodium sulfate ($Na_2SO_4$) is generally used as a fining agent. Such a sulfate is decomposed in the molten glass to produce a gas component, which promotes degassing of the glass melt; however, a portion of the gas component is dissolved and remains in the form of $SO_3$ in the glass composition. In the glass composition of the present invention, the content of $SO_3$ is preferably 0 to 0.3 mass %.

($CeO_2$)

$CeO_2$ is used as a fining agent. $O_2$ gas is produced due to the presence of $CeO_2$ in the molten glass, which means that $CeO_2$ contributes to degassing. However, too much $CeO_2$ colors the glass yellow. Therefore, the content of $CeO_2$ is preferably 0 to 0.5 mass %, more preferably 0 to 0.3 mass %, and even more preferably 0 to 0.1 mass %.

($SnO_2$)

For glass sheets formed by the float process, it is known that tin diffused from the tin bath is present in the form of $SnO_2$ in the glass that is in contact with the tin bath during the formation. $SnO_2$ mixed in the glass raw material contributes to degassing. In the glass composition of the present invention, the content of $SnO_2$ is preferably 0 to 0.3 mass %.

(Other Components)

Preferably, the glass composition of the present invention consists essentially of the components sequentially described above. However, the glass composition of the present invention may contain components other than the components sequentially described above. In this case, the content of each of the other components is preferably less than 0.1 mass %.

Examples of the other components that may be contained include $As_2O_5$, $Sb_2O_5$, Cl, and F which can be added for the purpose of degassing of the molten glass similarly to $SO_3$ and $SnO_2$ described above. However, $As_2O_5$, $Sb_2O_5$, Cl, and F are preferably not added for reasons such as their strong adverse effect on the environment. Additional examples of the other components that may be contained include ZnO, $P_2O_5$, $GeO_2$, $Ga_2O_3$, $Y_2O_3$, and $La_2O_3$. Still another component other than those mentioned above which is derived from an industrially-used raw material may be contained unless its content exceeds 0.1 mass %. These other components are those which are optionally added if necessary or which are inevitably contained; therefore, the glass composition of the present invention may be one which is substantially free of these components.

Hereinafter, the properties of the glass composition of the present invention will be described.

(Glass Transition Temperature: Tg)

According to the present invention, it is possible to provide a glass composition that has a lowered glass transition temperature (Tg) of 610° C. or less, even 590° C. or less, or, in some cases, 570° C. or less and that allows easy slow cooling of molten glass and therefore easy production. The lower limit of the glass transition temperature is not particularly specified. The lower limit of the glass transition temperature may be 530° C. or more, and is preferably 550° C. or more in order to prevent relaxation of the surface compressive stress produced by ion exchange.

(Working Temperature: $T_4$)

In the float process, the viscosity of the molten glass is adjusted to about $10^4$ dPa·s ($10^4$ P) when the molten glass is poured from the melting furnace into the float bath. For the production by the float process, the lower is the temperature (working temperature: $T_4$) at which the molten glass has a viscosity of $10^4$ dPa·s, the more preferable it is. For example, in order to form the glass into a thin sheet for use as a cover glass of a display, the working temperature $T_4$ of the molten glass is preferably about 1100° C. or less. According to the present invention, it is possible to provide a glass composition having a lowered $T_4$ of 1110° C. or less, 1100° C. or less, even 1090° C. or less, or, in some cases, 1070° C. or less and thus being suitable for production by the float process. The lower limit of $T_4$ is not particularly specified, and is, for example, 1000° C.

(Melting Temperature: $T_2$)

When the temperature (melting temperature: T2) at which the molten glass has a viscosity of $10^2$ dPa·s is low, the amount of energy required to melt the glass raw materials can be reduced, and the glass raw materials can be more easily dissolved so that degassing and fining of the glass melt are promoted. According to the present invention, it is possible to reduce $T_2$ to 1580° C. or less, 1550° C. or less, even 1530° C. or less, or, in some cases, 1500° C. or less.

(Difference Between Working Temperature and Liquidus Temperature: $T_4-T_L$)

In the float process, it is preferable that the molten glass not devitrify when the temperature of the molten glass is $T_4$. In other words, it is preferable that the difference between the working temperature ($T_4$) and the liquidus temperature ($T_L$) be large. According to the present invention, it is possible to provide a glass composition for which a difference obtained by subtracting the liquidus temperature from the working temperature is as large as −30° C. or more, even −10° C. or more, or, in some cases, 0° C. or more. In addition, according to the present invention, it is possible to reduce $T_L$ to 1050° C. or less, or even 1000° C. or less, so as to increase the difference $T_4-T_L$.

(Density (Specific Gravity): d)

It is desirable that a cover glass of a display with which an electronic device is equipped have a low density in terms of weight reduction of the electronic device. According to the present invention, it is possible to reduce the density of the glass composition to 2.53 g·cm$^{-3}$ or less, even 2.51 g·cm$^{-3}$ or less, or, in some cases, 2.50 g·cm$^{-3}$ or less.

When, in production by the float process or the like, the type of glass to be produced is changed from one to another, if there is a large difference in density between the two types of glass, molten glass of the one type having a higher density may reside at the bottom of the melting furnace, thereby affecting the change of the glass type. The density of soda lime glass, which is currently mass-produced by the float process, is about 2.50 g·cm$^{-3}$. Therefore, for the mass production by the float process, it is preferable that the glass composition have a density close to the value mentioned above. Specifically, the density of the glass composition is preferably 2.45 to 2.55 g·cm$^{-3}$, particularly preferably 2.47 to 2.53 g·cm$^{-3}$, and even more preferably 2.47 to 2.50 g·cm$^{-3}$.

(Elastic Modulus: E)

When a glass substrate is subjected to chemical strengthening involving ion exchange, the glass substrate may be warped. In order to reduce the warpage, the glass composition preferably has a high elastic modulus. According to the present invention, it is possible to increase the elastic modulus (Young's modulus: E) of the glass composition to 70 GPa or more, or even to 72 GPa or more.

The chemical strengthening of the glass composition will now be described.

(Conditions of Chemical Strengthening and Compressive Stress Layer)

Chemical strengthening of the glass composition of the present invention can be achieved by ion exchange treatment in which the glass composition containing sodium is brought into contact with a molten salt containing monovalent cations, preferably potassium ions, having an ionic radius larger than that of sodium ions so that the sodium ions in the glass composition are replaced by the monovalent cations. By doing so, a compressive stress layer with a compressive stress is formed in the glass surface.

A typical example of the molten salt is potassium nitrate. A molten salt mixture of potassium nitrate and sodium nitrate can also be used; however, it is preferable to use a molten salt of potassium nitrate alone because the concentration of the molten salt mixture is difficult to control.

The surface compressive stress and the compressive stress layer depth of a strengthened glass article can be controlled not only by the composition of the glass of the article but also by the temperature of the molten salt during the ion exchange treatment and the length of time of the ion exchange treatment.

It is possible to obtain a strengthened glass article having a compressive stress layer with a very high surface compressive stress and a very great depth by bringing the glass composition of the present invention into contact with a molten salt of potassium nitrate. Specifically, it is possible to obtain a strengthened glass article having a compressive stress layer with a surface compressive stress of 700 MPa or more and a depth of 20 μm or more. It is even possible to obtain a strengthened glass article having a compressive stress layer with a depth of 20 μm or more and a surface compressive stress of 750 MPa or more.

The strengthened glass article of the present invention has a very high surface compressive stress, and therefore its surface is resistant to scratching. In addition, the strengthened glass article of the present invention has a very deep compressive stress layer; therefore, even if a scratch is made in the surface, the scratch is less likely to reach deep into the glass article beyond the compressive stress layer, and the damage to the strengthened glass article by the scratch can therefore be reduced. The strengthened glass article of the present invention has a strength suitable for use as a cover glass of a display.

According to the present invention, it is possible to provide a glass composition having a relatively low $T_4$, suitable for production by the float process, and advantageous in forming the glass into a thin sheet for use as a cover glass of a display.

The strengthened glass article obtained by chemically strengthening the glass composition of the present invention is suitable for use as a cover glass of a liquid crystal display, an organic EL display, a touch-panel display or the like with which an electronic device is equipped. It should be noted that the glass composition of the present invention can be used, for example, as a substrate of an electronic device after being subjected to the chemical strengthening treatment or without being subjected to the treatment.

EXAMPLES

Hereinafter, the present invention will be described in more detail by way of examples and comparative examples. The present invention is not limited to the examples given below.

(Preparation of Glass Composition)

Silica, alumina, sodium carbonate, potassium carbonate, basic magnesium carbonate, and calcium carbonate, which are common raw materials of glass, were used to prepare glass formulations (batches) having the glass compositions shown in Tables 1 to 5. In some examples, sodium sulfate was used instead of sodium carbonate. Each of the prepared batches was put into a platinum crucible and heated in an electric furnace at 1550° C. for 4 hours to give molten glass. Next, the molten glass was poured and cooled on an iron plate to give a glass plate. Next, the glass plate was placed in the electric furnace and held at 600° C. for 2 hours, after which the furnace was powered off to slowly cool the glass plate to room temperature. In this manner, glass samples were obtained.

For each glass sample, the glass transition temperature Tg, the working temperature $T_4$, the melting temperature $T_2$, the liquidus temperature $T_L$, the density d, and the Young's modulus E were measured. Also, for each glass sample, the linear expansion coefficient α and the Vickers hardness Hv were measured.

The glass transition temperature Tg and the linear expansion coefficient α were measured using a differential thermal analyzer (Thermoflex TMA8140, manufactured by Rigaku Corporation). The working temperature $T_4$ and the melting temperature $T_2$ were measured by a platinum ball pulling-up method. The density d was measured by an Archimedes method. The Young's modulus E was measured according to JIS (Japanese Industrial Standards) R 1602. The Vickers hardness Hv was measured using a Vickers hardness tester (manufactured by Akashi Corporation) and based on the shape of an indentation formed after a load of 200 g was applied for 15 seconds and then removed.

The liquidus temperature $T_L$ was measured in the following manner. The glass sample was pulverized and sieved. Glass particles that passed through a 2380-μm mesh sieve but were retained on a 1000-μm mesh sieve were collected. These glass particles were immersed in ethanol, subjected to ultrasonic cleaning, and then dried in a thermostat. These glass particles weighing 25 g were spread to an approximately uniform thickness in a platinum boat having a width of 12 mm, a length of 200 mm, and a depth of 10 mm, and in this form were used as a measurement sample. This platinum boat was placed in an electric furnace (a temperature gradient furnace) with a temperature gradient from about 850 to 1200° C. for 24 hours. After that, the measurement sample was observed with an optical microscope at a magnification of 100, and the highest temperature in a region where devitrification was observed was determined to be the liquidus temperature. In all Examples and Comparative Examples, the glass particles of the measurement sample were fused together to form rods in the temperature gradient furnace.

(Preparation of Strengthened Glass)

Each of the glass samples prepared as above was cut into a 25 mm×35 mm piece, both surfaces of which were polished with alumina abrasive grains and further mirror-polished with cerium oxide abrasive grains. In this manner, four 1.1-mm-thick glass sheets both surfaces of which had a surface roughness Ra (Ra determined according to JIS B 0601-1994) of 2 nm or less were obtained for each composition.

These glass sheets were subjected to heat treatment as described below before subjected to chemical strengthening treatment. The purpose of performing this heat treatment was, by using the glasses prepared in a laboratory manner through melting in a crucible, to properly determine the surface compressive stress and the compressive stress layer depth of glass sheets that are produced from the same glass compositions by the float process and chemically strengthened.

The surface compressive stress and the compressive stress layer depth achieved by chemical strengthening of glass are greatly influenced by the conditions of slow cooling of the glass (see JP 2010-168252 A, for example). A glass sheet formed by a continuous sheet production process such as the float process cools at a higher rate during slow cooling than a glass sheet prepared in a laboratory manner through melting in a small crucible or the like. Therefore, if the glass sample prepared above is as such chemically strengthened and the surface compressive stress is measured for the glass sample, the measured compressive stress does not represent the surface compressive stress as measured for a glass sheet produced from the same glass composition by the float process after the glass sheet is chemically strengthened. The heat treatment mentioned above consists of the steps of; heating the cooled and solidified glass sample to an appropriate temperature and maintaining the temperature for a sufficient time so as to relax the glass structure; and subsequently cooling the glass sample at a relatively high rate. By so doing, the structure of the above-prepared glass sheet that has yet to be subjected to the chemical strengthening treatment can be made closer to the structure of a glass sheet produced from the same glass composition by the float process, with the result that the values of the surface compressive stress and the compressive stress layer depth of the above-prepared glass sheet subjected to chemical strengthening will be approximately equal to those measured for the glass sheet produced by the float process.

Specifically, the heat treatment was performed as follows. First, each glass sheet prepared above was heated to 600° C. in an electric furnace and held at the temperature for 16 hours, after which the glass sheet was taken out of the electric furnace, sandwiched between two insulating refractory materials made of ceramic fibers (ISOWOOL 1260 Blanket, manufactured by ISOLITE INSULATING PRODUCTS CO., LTD. and having a thickness of 50 mm), and cooled to room temperature.

This glass sheet was chemically strengthened by immersing it in a potassium nitrate molten salt (with a purity of not less than 99.5 mass %) having a predetermined temperature in the range of 380 to 460° C. for a predetermined time in the range of 4 to 12 hours. The glass sheet subjected to the chemical strengthening treatment was washed with 80° C. hot water. In this manner, strengthened glass sheets were obtained.

In order to reduce the thermal shock applied to the glass sheets, each of them was preheated before immersion in the molten salt and was slowly cooled after the end of the immersion (i.e., after the glass sheet was taken out of the molten salt). The preheating was performed by a procedure in which the glass sheet was held for 10 minutes in a space lying within the container holding the molten salt and above the liquid level of the molten salt. The slow cooling was performed by the same procedure used for the preheating. This procedure of slow cooling has also the effect of returning to the molten salt container as much as possible of the molten salt entrained by the glass sheet taken out.

For the strengthened glass sheets obtained as above, the surface compressive stress and the compression depth (the depth of the compressive stress layer) were measured using a surface stress meter "FSM-6000 LE" manufactured by Orihara Industrial Co., Ltd. The results are collectively shown in Tables 1 to 5.

In all Examples, the glass transition temperature Tg was not more than 590° C. Additionally, in most Examples, the working temperature $T_4$ was not more than 1100° C., and the melting temperature $T_2$ was not more than 1550° C., which demonstrated that sufficient fining, and therefore production of a high quality glass sheet, can be achieved by the float process in a conventional float glass production facility. Additionally, in most Examples subjected to measurement, the difference $T_4-T_L$ obtained by subtracting the liquidus temperature $T_L$ from the working temperature $T_4$ was not less than −10° C. In all Examples, the density d was in the range of 2.45 to 2.50 g·cm$^{-3}$, which demonstrated good suitability for production of glass sheets by the float process.

In all Examples, strengthened glass articles having a compressive stress layer with a high surface compressive stress (700 MPa or more) and a great depth (20 μm or more) were successfully obtained, which demonstrated good suitability for a cover glass for a display.

By contrast, in the cases of the glass compositions of Comparative Examples 15, 17, 18, 20 to 23, and 25 to 30 in which the content of $Al_2O_3$ was too low, Comparative Examples 1 and 14 to 18 in which the content of MgO was too low, Comparative Examples 24 to 27, 29, and 30 in which the content of CaO was too low, Comparative Examples 1 to 3 and 21 in which the content of CaO was too high, and Comparative Examples 15, 17, 19, and 26 in which the content of $Na_2O$ was too high, a compressive stress layer with a depth of 20 μm or more and a surface compressive stress of 700 MPa or more failed to be obtained.

As for the surface compressive stress alone, Comparative Examples 11 to 13, for example, showed values of more than 700 MPa; however, in all of these Comparative Examples, the compressive stress layer depth was no more than 9 to 11 μm. Additionally, in Comparative Example 11, $T_4-T_L$ was −60° C., which means the susceptibility to devitrification was very high. Furthermore, in Comparative Example 12 and Comparative Example 13, $T_2$ was more than 1550° C. and $T_4$ was more than 1100° C. These facts suggested that the glass compositions of all of these Comparative Examples are unsuitable for production by the float process.

In the cases of the glass compositions of other Comparative Examples including Comparative Examples 4, 8 to 10, and 13 in which the content of $Al_2O_3$ was too high, Comparative Examples 12 and 13 in which the content of MgO was too high, Comparative Examples 2 and 3 in which the content of CaO was too high, Comparative Examples 3, 5, 6, and 9 to 12 in which the content of $Na_2O$ was too low, and Comparative Example 7 in which the content of $K_2O$ was too high, $T_2$ was more than 1550° C., or $T_4$ was more than 1100° C., or $T_4-T_L$ was less than −10° C., which suggested that the glass compositions are unsuitable for production by the float process, are disadvantageous in formation into a thin sheet for use as a cover glass of a display, and require such a high energy for glass melting that fining is made difficult.

TABLE 1

| | | Examples | | | | | | | | | |
|---|---|---|---|---|---|---|---|---|---|---|---|
| | | 1 | 2 | 3 | 4 | 5 | 6 | 7 | 8 | 9 | 10 |
| Composition [mol %] | $SiO_2$ | 70.0 | 70.0 | 67.5 | 67.5 | 70.0 | 70.0 | 67.5 | 67.5 | 70.0 | 70.0 |
| | $Al_2O_3$ | 2.5 | 2.5 | 2.5 | 2.5 | 2.5 | 2.5 | 2.5 | 2.5 | 2.5 | 2.5 |
| | MgO | 12.3 | 10.9 | 13.5 | 12.0 | 11.8 | 12.8 | 13.0 | 14.0 | 9.6 | 8.2 |
| | CaO | 1.4 | 2.8 | 1.5 | 3.0 | 1.4 | 1.4 | 1.5 | 1.5 | 4.1 | 5.5 |
| | $Na_2O$ | 13.2 | 13.2 | 14.4 | 14.4 | 13.7 | 12.7 | 14.9 | 13.9 | 13.2 | 13.2 |
| | $K_2O$ | 0.6 | 0.6 | 0.6 | 0.6 | 0.6 | 0.6 | 0.6 | 0.6 | 0.6 | 0.6 |
| | RO | 13.7 | 13.7 | 15.0 | 15.0 | 13.2 | 14.2 | 14.5 | 15.5 | 13.7 | 13.7 |
| | $R_2O$ | 13.8 | 13.8 | 15.0 | 15.0 | 14.3 | 13.3 | 15.5 | 14.5 | 13.8 | 13.8 |
| Molar ratio CaO/RO | | 0.10 | 0.20 | 0.10 | 0.20 | 0.11 | 0.10 | 0.10 | 0.10 | 0.30 | 0.40 |
| $T_2$ [° C.] | | 1567 | 1550 | 1513 | 1493 | 1566 | 1572 | 1510 | 1516 | 1534 | 1516 |
| $T_4$ [° C.] | | 1107 | 1092 | 1063 | 1052 | 1099 | 1106 | 1060 | 1067 | 1082 | 1072 |
| Tg [° C.] | | 572 | 567 | 567 | 562 | 570 | 587 | 560 | 575 | 569 | 565 |
| Linear expansion coefficient α [×$10^{-7}$° $C.^{-1}$] | | 85 | 88 | 91 | 89 | 86 | 80 | 90 | 88 | 86 | 89 |
| $T_L$ [° C.] | | 996 | 1042 | 980 | 1046 | | | | | 1066 | 1059 |
| Density d [g · $cm^{-3}$] | | 2.448 | 2.457 | 2.470 | 2.479 | 2.448 | 2.447 | 2.468 | 2.468 | 2.471 | 2.476 |
| Young's modulus E [GPa] | | 72 | 73 | 73 | 73 | 72 | 73 | 72 | 73 | 74 | 74 |
| Vickers hardness Hv | | 489 | 490 | 487 | 500 | 489 | 496 | 493 | 500 | 485 | 492 |
| Surface compressive stress [MPa] | | 739 | 745 | 762 | 753 | 774 | 749 | 769 | 766 | 717 | 737 |
| Depth of compressive stress layer [μm] | | 26.5 | 22.4 | 24.9 | 22.3 | 20.7 | 23.5 | 21.0 | 23.9 | 24.9 | 20.0 |
| Chemical strengthening conditions | Temperature | 420° C. | 420° C. | 420° C. | 420° C. | 420° C. | 420° C. | 420° C. | 420° C. | 420° C. | 420° C. |
| | Time | 8 hr | 8 hr | 8 hr | 8 hr | 4 hr | 8 hr | 4 hr | 8 hr | 12 hr | 8 hr |

TABLE 2

| | | Examples | | | | | | | |
|---|---|---|---|---|---|---|---|---|---|
| | | 11 | 12 | 13 | 14 | 15 | 16 | 17 | 18 |
| Composition [mol %] | $SiO_2$ | 67.5 | 67.5 | 68.0 | 67.5 | 68.5 | 68.0 | 69.5 | 69.0 |
| | $Al_2O_3$ | 2.5 | 2.5 | 2.5 | 2.5 | 2.5 | 2.5 | 2.5 | 2.5 |
| | MgO | 10.5 | 9.0 | 11.0 | 11.2 | 10.1 | 10.3 | 8.4 | 8.5 |
| | CaO | 4.5 | 6.0 | 3.7 | 3.8 | 4.4 | 4.4 | 5.6 | 5.7 |
| | $Na_2O$ | 14.4 | 14.4 | 14.2 | 14.4 | 13.9 | 14.2 | 13.4 | 13.7 |
| | $K_2O$ | 0.6 | 0.6 | 0.6 | 0.6 | 0.6 | 0.6 | 0.6 | 0.6 |
| | RO | 15.0 | 15.0 | 14.7 | 15.0 | 14.5 | 14.7 | 14.0 | 14.2 |
| | $R_2O$ | 15.0 | 15.0 | 14.8 | 15.0 | 14.5 | 14.8 | 14.0 | 14.3 |
| Molar ratio CaO/RO | | 0.30 | 0.40 | 0.25 | 0.25 | 0.30 | 0.30 | 0.40 | 0.40 |
| $T_2$ [° C.] | | 1473 | 1454 | 1491 | 1483 | 1497 | 1485 | 1503 | 1485 |
| $T_4$ [° C.] | | 1041 | 1030 | 1056 | 1046 | 1057 | 1049 | 1063 | 1052 |
| Tg [° C.] | | 558 | 556 | 566 | 563 | 566 | 562 | 567 | 565 |
| Linear expansion coefficient α [×$10^{-7}$° $C.^{-1}$] | | 88 | 92 | 91 | 94 | 90 | 92 | 84 | 89 |
| $T_L$ [° C.] | | 1057 | 1059 | 1041 | 1052 | 1050 | 1052 | 1057 | 1054 |
| Density d [g · $cm^{-3}$] | | 2.489 | 2.499 | 2.480 | 2.484 | 2.481 | 2.484 | 2.482 | 2.486 |
| Young's modulus E [GPa] | | 74 | 74 | 73 | 74 | 74 | 74 | 74 | 74 |
| Vickers hardness Hv | | 498 | 507 | 496 | 501 | 501 | 501 | 502 | 511 |
| Surface compressive stress [MPa] | | 745 | 736 | 747 | 741 | 739 | 730 | 700 | 705 |
| Depth of compressive stress layer [μm] | | 20.1 | 20.0 | 22.2 | 22.1 | 20.3 | 21.6 | 22.9 | 23.0 |
| Chemical strengthening conditions | Temperature | 420° C. | 420° C. | 420° C. | 420° C. | 420° C. | 420° C. | 420° C. | 420° C. |
| | Time | 8 hr | 8 hr | 8 hr | 8 hr | 8 hr | 8 hr | 12 hr | 12 hr |

TABLE 3

| | | Comparative Examples | | | | | | | | | |
|---|---|---|---|---|---|---|---|---|---|---|---|
| | | 1 | 2 | 3 | 4 | 5 | 6 | 7 | 8 | 9 | 10 |
| Composition [mol %] | $SiO_2$ | 70.8 | 65.0 | 70.0 | 70.0 | 72.5 | 72.5 | 70.0 | 70.0 | 70.0 | 70.0 |
| | $Al_2O_3$ | 1.0 | 2.5 | 2.5 | 5.0 | 2.5 | 2.5 | 2.5 | 5.0 | 5.0 | 5.0 |
| | MgO | 5.9 | 8.1 | 8.3 | 9.0 | 10.0 | 11.2 | 12.3 | 5.0 | 7.5 | 13.5 |
| | CaO | 8.5 | 8.1 | 8.3 | 1.0 | 2.5 | 1.3 | 1.4 | 5.0 | 7.5 | 1.5 |
| | $Na_2O$ | 13.2 | 16.3 | 11.0 | 15.0 | 11.9 | 11.9 | 12.6 | 15.0 | 10.0 | 10.0 |
| | $K_2O$ | 0.6 | 0 | 0 | 0 | 0.6 | 0.6 | 1.2 | 0 | 0 | 0 |

TABLE 3-continued

| | Comparative Examples | | | | | | | | | |
|---|---|---|---|---|---|---|---|---|---|---|
| | 1 | 2 | 3 | 4 | 5 | 6 | 7 | 8 | 9 | 10 |
| RO | 14.4 | 16.2 | 16.5 | 10.0 | 12.5 | 12.5 | 13.7 | 10.0 | 15.0 | 15.0 |
| $R_2O$ | 13.7 | 16.3 | 11.0 | 15.0 | 12.5 | 12.5 | 13.8 | 15.0 | 10.0 | 10.0 |
| Molar ratio CaO/RO | 0.59 | 0.50 | 0.50 | 0.10 | 0.20 | 0.10 | 0.10 | 0.50 | 0.50 | 0.10 |
| $T_2$ [° C.] | 1462 | 1363 | 1489 | 1622 | 1611 | 1627 | 1577 | 1569 | 1566 | 1645 |
| $T_4$ [° C.] | 1039 | 971 | 1068 | 1148 | 1133 | 1142 | 1106 | 1119 | 1137 | 1182 |
| Tg [° C.] | 558 | 551 | 594 | 580 | 581 | 586 | 572 | 567 | 622 | 639 |
| Linear expansion coefficient α [$\times 10^{-7}$ ° $C.^{-1}$] | 89 | 96 | 78 | 84 | 79 | 81 | 87 | 88 | 73 | 69 |
| $T_L$ [° C.] | | 1046 | >1134 | | 1053 | | 1003 | | | |
| Density d [g·$cm^{-3}$] | 2.495 | 2.531 | 2.493 | 2.439 | 2.434 | 2.427 | 2.448 | 2.469 | 2.479 | 2.447 |
| Young's modulus E [GPa] | 74 | 75 | 76 | 71 | 73 | 73 | 73 | 73 | 77 | 77 |
| Vickers hardness Hv | 502 | 519 | 521 | 494 | 518 | 503 | 486 | 500 | 551 | 529 |
| Surface compressive stress [MPa] | 670 | 670 | 687 | 681 | 672 | 675 | 674 | 680 | 745 | 785 |
| Depth of compressive stress layer [μm] | 14.8 | 15.4 | 6.2 | 34.2 | 26.5 | 30.9 | 31.1 | 28.1 | 8.1 | 16.1 |
| Chemical strengthening conditions Temperature | 420° C. | 420° C. | 420° C. | 420° C. | 420° C. | 420° C. | 420° C. | 420° C. | 420° C. | 420° C. |
| Chemical strengthening conditions Time | 8 hr | 8 hr | 4 hr | 8 hr | 12 hr | 12 hr | 12 hr | 8 hr | 4 hr | 8 hr |

TABLE 4

| | | Comparative Examples | | | | | | | | | |
|---|---|---|---|---|---|---|---|---|---|---|---|
| | | 11 | 12 | 13 | 14 | 15 | 16 | 17 | 18 | 19 | 20 |
| Composition [mol %] | $SiO_2$ | 68.5 | 70.0 | 65.0 | 70.0 | 70.0 | 70.0 | 65.0 | 70.0 | 68.5 | 70.0 |
| | $Al_2O_3$ | 2.5 | 2.5 | 5.0 | 2.5 | 0 | 2.5 | 0 | 0 | 2.5 | 0 |
| | MgO | 13.9 | 16.5 | 18.0 | 5.5 | 6.0 | 6.9 | 7.0 | 7.5 | 8.1 | 9.0 |
| | CaO | 3.5 | 0 | 0 | 5.5 | 6.0 | 6.9 | 7.0 | 7.5 | 3.5 | 9.0 |
| | $Na_2O$ | 10.8 | 11.0 | 12.0 | 16.5 | 18.0 | 13.7 | 21.0 | 15.0 | 16.8 | 12.0 |
| | $K_2O$ | 0.8 | 0 | 0 | 0 | 0 | 0 | 0 | o | 0.6 | 0 |
| RO | | 17.4 | 16.5 | 18.0 | 11.0 | 12.0 | 13.8 | 14.0 | 15.0 | 11.6 | 18.0 |
| $R_2O$ | | 11.6 | 11.0 | 12.0 | 16.5 | 18.0 | 13.7 | 21.0 | 15.0 | 17.4 | 12.0 |
| Molar ratio CaO/RO | | 0.20 | 0.00 | 0.00 | 0.50 | 0.50 | 0.50 | 0.50 | 0.50 | 0.30 | 0.50 |
| $T_2$ [° C.] | | 1528 | 1597 | 1556 | 1492 | 1415 | 1490 | 1288 | 1413 | 1492 | 1411 |
| $T_4$ [° C.] | | 1086 | 1130 | 1119 | 1048 | 977 | 1058 | 889 | 988 | 1042 | 999 |
| Tg [° C.] | | 610 | 632 | 636 | 542 | 519 | 569 | 511 | 546 | 548 | 570 |
| Linear expansion coefficient α [$\times 10^{-7}$ ° $C.^{-1}$] | | 79 | 71 | 78 | 93 | 103 | 87 | 116 | 94 | 100 | 83 |
| $T_L$ [° C.] | | >1146 | | | 885 | | 1046 | | 972 | 907 | |
| Density d [g·$cm^{-3}$] | | 2.472 | 2.437 | 2.479 | 2.479 | 2.493 | 2.486 | 2.536 | 2.500 | 2.476 | 2.507 |
| Young's modulus E [GPa] | | | 75 | 77 | 72 | 71 | 74 | 72 | 73 | | 76 |
| Vickers hardness Hv | | 517 | 520 | 551 | 489 | 490 | 508 | 502 | 499 | 479 | 521 |
| Surface compressive stress [MPa] | | 903 | 788 | 900 | 640 | 670 | 609 | 629 | 593 | 663 | 683 |
| Depth of compressive stress layer [μm] | | 9.2 | 11.1 | 10.7 | 17.8 | 11.0 | 20.0 | 11.9 | 15.5 | 23.2 | 9.6 |
| Chemical strengthening conditions Temperature | | 420° C. | 420° C. | 420° C. | 420° C. | 380° C. | 460° C. | 380° C. | 420° C. | 420° C. | 420° C. |
| Chemical strengthening conditions Time | | 4 hr | 4 hr | 4 hr | 4 hr | 4 hr | 4 hr | 4 hr | 8 hr | 4 hr | 12 hr |

TABLE 5

| | | Comparative Examples | | | | | | | | | |
|---|---|---|---|---|---|---|---|---|---|---|---|
| | | 21 | 22 | 23 | 24 | 25 | 26 | 27 | 28 | 29 | 30 |
| Composition [mol %] | $SiO_2$ | 65.0 | 69.1 | 70.0 | 70.0 | 70.0 | 65.0 | 70.0 | 70.0 | 70.0 | 65.0 |
| | $Al_2O_3$ | 0 | 0.9 | 0 | 2.5 | 0 | 0 | 0 | 0 | 0 | 0 |
| | MgO | 10.5 | 10.5 | 10.8 | 11.0 | 12.0 | 14.0 | 15.0 | 16.2 | 18.0 | 21.0 |
| | CaO | 10.5 | 4.5 | 1.2 | 0 | 0 | 0 | 0 | 1.8 | 0 | 0 |
| | $Na_2O$ | 14.0 | 14.2 | 18.0 | 16.5 | 18.0 | 21.0 | 15.0 | 12.0 | 12.0 | 14.0 |
| | $K_2O$ | 0 | 0.8 | 0 | 0 | 0 | 0 | 0 | 0 | 0 | 0 |

TABLE 5-continued

| | Comparative Examples | | | | | | | | | |
|---|---|---|---|---|---|---|---|---|---|---|
| | 21 | 22 | 23 | 24 | 25 | 26 | 27 | 28 | 29 | 30 |
| RO | 21.0 | 15.0 | 12.0 | 11.0 | 12.0 | 14.0 | 15.0 | 18.0 | 18.0 | 21.0 |
| $R_2O$ | 14.0 | 15.0 | 18.0 | 16.5 | 18.0 | 21.0 | 15.0 | 12.0 | 12.0 | 14.0 |
| Molar ratio CaO/RO | 0.50 | 0.30 | 0.10 | 0.00 | 0.00 | 0.00 | 0.00 | 0.10 | 0.00 | 0.00 |
| $T_2$ [° C.] | 1283 | 1468 | 1478 | 1564 | 1494 | 1380 | 1511 | 1505 | 1529 | 1421 |
| $T_4$ [° C.] | 914 | 1026 | 1013 | 1089 | 1022 | 941 | 1044 | 1053 | 1067 | 993 |
| Tg [° C.] | 551 | 561 | 517 | 554 | 517 | 507 | 559 | 583 | 596 | 583 |
| Linear expansion coefficient α [×10$^{-7}$° C.$^{-1}$] | 93 | 93 | 103 | 90 | 101 | 116 | 88 | 77 | 72 | 87 |
| $T_L$ [° C.] | | 1023 | | | | | | | | |
| Density d [g·cm$^{-3}$] | 2.509 | 2.480 | 2.458 | 2.439 | 2.448 | 2.485 | 2.444 | 2.456 | 2.443 | 2.491 |
| Young's modulus E [GPa] | 74 | | 68 | 69 | 67 | 68 | 70 | 74 | 73 | 75 |
| Vickers hardness Hv | 529 | 491 | 466 | 470 | 460 | 468 | 471 | 508 | 502 | 516 |
| Surface compressive stress [MPa] | 534 | 676 | 426 | 601 | 584 | 527 | 650 | 659 | 623 | 637 |
| Depth of compressive stress layer [μm] | 19.0 | 21.3 | 30.2 | 29.9 | 19.6 | 21.7 | 21.1 | 14.6 | 21.4 | 19.7 |
| Chemical strengthening conditions Temperature | 460° C. | 420° C. | 420° C. | 420° C. | 380° C. | 380° C. | 420° C. | 420° C. | 460° C. | 460° C. |
| Chemical strengthening conditions Time | 4 hr | 8 hr | 4 hr | 4 hr | 4 hr | 4 hr | 4 hr | 8 hr | 4 hr | 4 hr |

INDUSTRIAL APPLICABILITY

The present invention can provide a glass composition intended, for example, for use in a cover glass for a display and suitable for production by the float process.

The invention claimed is:

1. A glass composition comprising, in mol %:
66 to 72% $SiO_2$;
2% or more and less than 3% $Al_2O_3$;
8 to 15% MgO;
1 to 8% CaO;
12 to 16% $Na_2O$; and
0 to 1% $K_2O$, wherein
a total content of MgO and CaO is in a range of 12 to 17%, and
a molar ratio of CaO to the total content of MgO and CaO is in a range of 0.1 to 0.4.

2. The glass composition according to claim 1, comprising, in mol %:
3 to 7% CaO.

3. The glass composition according to claim 1, wherein a temperature $T_4$ at which the glass composition has a viscosity of $10^4$ dPa·s is 1100° C. or less.

4. The glass composition according to claim 1, wherein a temperature $T_2$ at which the glass composition has a viscosity of $10^2$ dPa·s is 1550° C. or less.

5. The glass composition according to claim 1, wherein a difference obtained by subtracting a liquidus temperature $T_L$ from the temperature $T_4$ at which the glass composition has a viscosity of $10^4$ dPa·s is −10° C. or more.

6. The glass composition according to claim 1, comprising:
a glass matrix component consisting essentially of, in mol %,
67 to 70% $SiO_2$,
0 to 0.5% $B_2O_3$,
2% or more and less than 3% $Al_2O_3$,
8 to 12% MgO,
3 to 7% CaO,
0 to 1% $Li_2O$,
12 to 16% $Na_2O$, and
0 to 1% $K_2O$; and
additional components including, in mass % calculated with respect to total 100 mass % of the glass composition,
0.15% or less total iron oxide in terms of $Fe_2O_3$,
0.3% or less $SO_3$,
0.5% or less $CeO_2$,
0.3% or less $SnO_2$,
0.2% or less $TiO_2$, and
0.1% or less $ZrO_2$, wherein
in the glass matrix component,
the total content of MgO and CaO is in a range of 12 to 17 mol %, and
the molar ratio of CaO to the total content of MgO and CaO is in a range of 0.2 to 0.4.

7. The glass composition according to claim 6, wherein the glass composition is substantially free of $B_2O_3$.

8. The glass composition according to claim 7, wherein the glass composition is substantially free of $Li_2O$.

9. A glass composition for chemical strengthening, wherein the glass composition for chemical strengthening comprises the glass composition according to claim 1, and is used in chemical strengthening treatment.

10. A strengthened glass article, comprising a compressive stress layer formed as a surface of the strengthened glass article by bringing a glass article comprising the glass composition according to claim 1 into contact with a molten salt containing monovalent cations having an ionic radius larger than that of sodium ions so as to allow ion exchange to take place between sodium ions contained in the glass composition and the monovalent cations.

11. The strengthened glass article according to claim 10, wherein the glass article is a glass sheet produced by a float process.

12. The strengthened glass article according to claim 10, wherein the compressive stress layer has a surface compressive stress of 700 MPa or more, and the compressive stress layer has a depth of 20 μm or more.

13. A cover glass for a display, the cover glass comprising the strengthened glass article according to claim 10.

* * * * *